US010731500B2

(12) United States Patent
Ortiz

(10) Patent No.: US 10,731,500 B2
(45) Date of Patent: Aug. 4, 2020

(54) PASSIVE TIP CLEARANCE CONTROL WITH VARIABLE TEMPERATURE FLOW

(71) Applicant: UNITED TECHNOLOGIES CORPORATION, Farmington, CT (US)

(72) Inventor: Jonathan Ortiz, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 715 days.

(21) Appl. No.: 15/405,957

(22) Filed: Jan. 13, 2017

(65) Prior Publication Data

US 2018/0202307 A1  Jul. 19, 2018

(51) Int. Cl.
*F01D 11/24* (2006.01)
*F02C 7/18* (2006.01)
*F01D 11/18* (2006.01)

(52) U.S. Cl.
CPC .............. *F01D 11/24* (2013.01); *F01D 11/18* (2013.01); *F02C 7/18* (2013.01); *F05D 2220/32* (2013.01); *F05D 2240/11* (2013.01); *F05D 2240/35* (2013.01); *F05D 2260/213* (2013.01); *Y02T 50/676* (2013.01)

(58) Field of Classification Search
CPC .......... F01D 11/14; F01D 11/16; F01D 11/18; F01D 11/20; F01D 11/24; F05D 2220/32; F05D 2240/11; F05D 2240/35; F05D 2260/20; F05D 2260/213; F05D 2260/30; F02C 7/18; F02C 7/185; F02C 9/18; Y02T 50/676
See application file for complete search history.

(56) References Cited

U.S. PATENT DOCUMENTS

| 4,213,296 | A | 7/1980 | Schwarz |
| 4,893,984 | A | 1/1990 | Davison et al. |
| 5,282,721 | A | 2/1994 | Kildea |
| 5,403,158 | A | 4/1995 | Auxier |
| 5,688,107 | A | 11/1997 | Downs et al. |
| 6,126,390 | A | 10/2000 | Bock |

(Continued)

OTHER PUBLICATIONS

European Search Report for European Application No. 18151663.4, dated May 22, 2018.

*Primary Examiner* — Patrick Hamo
*Assistant Examiner* — Chirag Jariwala
(74) *Attorney, Agent, or Firm* — Carlson, Gaskey & Olds, P.C.

(57) ABSTRACT

A clearance control system for a gas turbine engine comprises a blade outer air seal mounted on a carrier. At least one blade is rotatable about an engine axis. The blade outer air seal is spaced radially outwardly from a tip of the blade by a clearance. A heat exchanger is configured to deliver air at a first temperature to the blade outer air seal at a first operating condition to allow the blade outer air seal to move in a first direction to maintain a desired clearance, and configured to deliver air at a second temperature to the blade outer air seal at a second operating condition to allow the blade outer air seal to move in a second direction to maintain a desired clearance, and wherein the second temperature is less than the first temperature. A gas turbine engine and a method of controlling tip clearance in a gas turbine engine are also disclosed.

25 Claims, 7 Drawing Sheets

(56) References Cited

U.S. PATENT DOCUMENTS

| | | | |
|---|---|---|---|
| 7,140,836 B2 | 11/2006 | Balsdon | |
| 7,210,899 B2 | 5/2007 | Wilson, Jr. | |
| 7,588,414 B2 | 9/2009 | Wunderlich et al. | |
| 7,704,039 B1 | 4/2010 | Liang | |
| 7,717,671 B2 | 5/2010 | Addis | |
| 7,874,793 B2 | 1/2011 | Razzell et al. | |
| 8,360,712 B2 | 1/2013 | Deo et al. | |
| 8,721,257 B2 | 5/2014 | Lewis et al. | |
| 10,612,469 B2 * | 4/2020 | Guardi | F23R 3/286 |
| 2004/0071548 A1 | 4/2004 | Wilson, Jr. | |
| 2005/0109016 A1 * | 5/2005 | Ullyott | F01D 11/24 60/282 |
| 2008/0112797 A1 | 5/2008 | Seitzer et al. | |
| 2008/0112798 A1 * | 5/2008 | Seitzer | F01D 11/24 415/144 |
| 2013/0104564 A1 * | 5/2013 | Arar | F01D 11/24 60/782 |
| 2015/0098791 A1 | 4/2015 | Ballard, Jr. et al. | |
| 2015/0308282 A1 | 10/2015 | Bacic et al. | |
| 2015/0369076 A1 * | 12/2015 | McCaffrey | F01D 11/24 415/173.1 |
| 2016/0312643 A1 | 10/2016 | Davis et al. | |

* cited by examiner

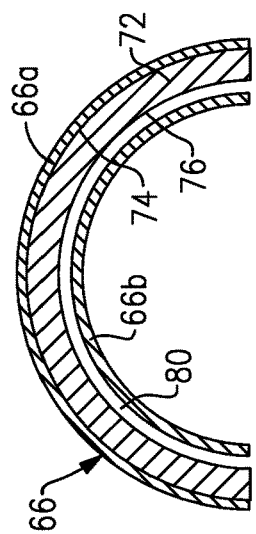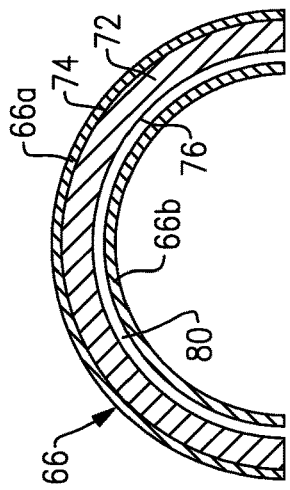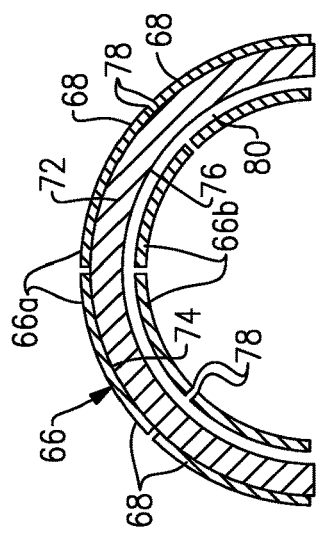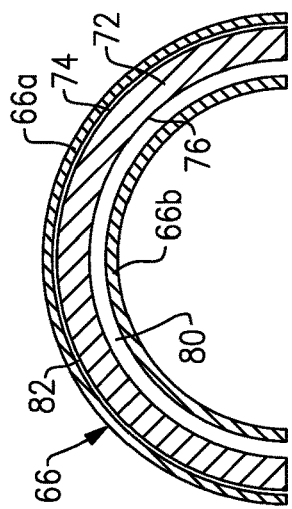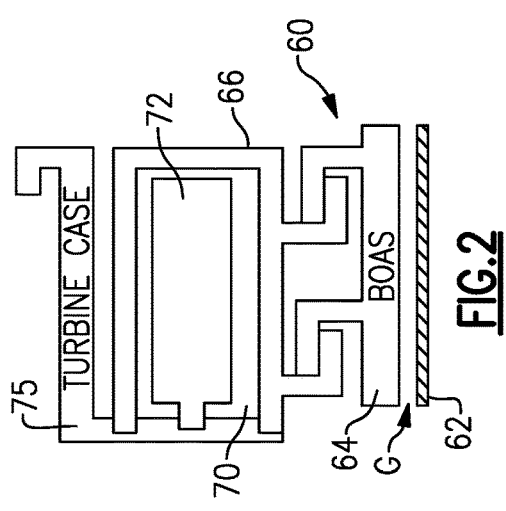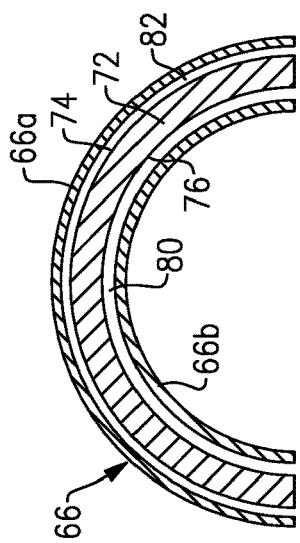

PASSIVE TIP CLEARANCE CONTROL WITH VARIABLE TEMPERATURE FLOW

BACKGROUND OF THE INVENTION

Gas turbine engines typically include a fan delivering air into a compressor. The air is compressed in the compressor and delivered into a combustion section where it is mixed with fuel and ignited. Products of this combustion pass downstream over turbine blades, driving them to rotate. Turbine rotors, in turn, drive the compressor and fan rotors. The efficiency of the engine is impacted by ensuring that the products of combustion pass in as high a percentage as possible across the turbine blades. Leakage around the blades reduces efficiency. Thus, a blade outer air seal (BOAS) is provided radially outward of the blades to prevent leakage.

The BOAS is spaced from a radially outer part of the blade by a tip clearance. The BOAS is associated with a carrier element that is mounted to a case structure. Since the blades, the BOAS, and structure that support the BOAS are different sizes and/or are formed of different materials, they respond to temperature changes in different manners. As these structures expand at different rates during heating, the tip clearance may be reduced and the blade may rub on the BOAS, which is undesirable.

Clearance control systems are used to control the tip clearance under different operational conditions. These systems can comprise active control and/or passive control systems. The systems have a predefined limiting clearance condition that sets all other clearances throughout the flight envelope. Further reducing these clearances to be lower throughout the flight envelope helps meet increasing engine efficiency demands.

SUMMARY OF THE INVENTION

In a featured embodiment, a clearance control system for a gas turbine engine comprises a blade outer air seal mounted on a carrier. At least one blade is rotatable about an engine axis. The blade outer air seal is spaced radially outwardly from a tip of the blade by a clearance. A heat exchanger is configured to deliver air at a first temperature to the blade outer air seal at a first operating condition to allow the blade outer air seal to move in a first direction to maintain a desired clearance, and configured to deliver air at a second temperature to the blade outer air seal at a second operating condition to allow the blade outer air seal to move in a second direction to maintain a desired clearance, and wherein the second temperature is less than the first temperature.

In another embodiment according to the previous embodiment, the first operating condition comprises an engine accelerating condition. The air supplied at the first temperature directly heats the carrier to move the blade outer air seal radially outwardly in the first direction.

In another embodiment according to any of the previous embodiments, the second operating condition comprises an engine cruise condition and wherein air supplied at the second temperature directly cools the carrier to move the blade outer air seal radially inwardly in the second direction.

In another embodiment according to any of the previous embodiments, the heat exchanger is configured to additionally provide cooling flow to the blade at a radially inward location of the blade outer air seal.

In another embodiment according to any of the previous embodiments, the blade comprises a first stage of a turbine.

In another embodiment according to any of the previous embodiments, a mixing chamber has a first inlet that receives flow from the heat exchanger. The mixing chamber has a first outlet to direct flow to the carrier and a second outlet to direct flow to the blade.

In another embodiment according to any of the previous embodiments, a temperature of the flow exiting the heat exchanger at the first inlet is set based on a desired temperature for each flight operating condition.

In another embodiment according to any of the previous embodiments, the mixing chamber includes a second inlet that receives diffuser chamber flow to be mixed with flow exiting the heat exchanger.

In another embodiment according to any of the previous embodiments, a diffuser chamber is positioned upstream of the blade, and includes a wall portion that defines a first flow path radially outward of the diffuser chamber and radially inward of a case structure that supports the carrier. The first outlet from the mixing chamber directs flow into the first flow path.

In another embodiment according to any of the previous embodiments, a second flow path is provided radially inward of the diffuser chamber. The second outlet directs flow from the mixing chamber into the second flow path.

In another embodiment according to any of the previous embodiments, the carrier is comprised of a plurality of circumferentially spaced carrier portions each having a cavity that receives a control ring.

In another featured embodiment, a gas turbine engine comprises a compressor section, a combustor section downstream of the compressor section, and a turbine section downstream of the combustor section. The turbine section includes a plurality of blades rotatable about an engine axis and a blade outer air seal mounted on a carrier. The blade outer air seal is spaced radially outwardly from a tip of the blades by a clearance. A clearance control system with a heat exchanger is configured to deliver air at a first temperature to the blade outer air seal at a first operating condition to allow the blade outer air seal to move in a first direction to maintain a desired clearance, and configured to deliver air at a second temperature to the blade outer air seal at a second operating condition to allow the blade outer air seal to move in a second direction to maintain a desired clearance, and wherein the second temperature is less than the first temperature.

In another embodiment according to the previous embodiment, the carrier is comprised of a plurality of circumferentially spaced carrier portions each having a cavity that receives a control ring that mounts the carrier to a case structure.

In another embodiment according to any of the previous embodiments, the first operating condition comprises an engine accelerating condition and wherein the air supplied at the first temperature directly heats the carrier to move the blade outer air seal radially outwardly in the first direction, and wherein the second operating condition comprises an engine cruise condition and wherein air supplied at the second temperature directly cools the carrier to move the blade outer air seal radially inwardly in the second direction.

In another embodiment according to any of the previous embodiments, a mixing chamber has a first inlet that receives flow from the heat exchanger. The mixing chamber has a first outlet to direct flow to the carrier and a second outlet to direct flow to the blade at a radially inward location of the blade outer air seal.

In another embodiment according to any of the previous embodiments, the combustion section includes a diffuser chamber, and includes a second inlet that receives diffuser chamber air from the diffuser chamber, and including a wall portion that defines a first flow path radially outward of the diffuser chamber and radially inward of the case structure that supports the carrier, and wherein the first outlet from the mixing chamber directs flow into the first flow path.

In another embodiment according to any of the previous embodiments, a second flow path is included radially inward of the diffuser chamber, and the second outlet directs flow into the second flow path to cool the blade.

In another embodiment according to any of the previous embodiments, a method of controlling tip clearance in a gas turbine engine includes providing a blade outer air seal mounted on a carrier and at least one blade rotatable about an engine axis, the blade outer air seal being spaced radially outwardly from a tip of the blade by a clearance. Air is delivered at a first temperature to the blade outer air seal at a first operating condition to allow the blade outer air seal to move in a first direction to maintain a desired clearance. Air is delivered at a second temperature to the blade outer air seal at a second operating condition to allow the blade outer air seal to move in a second direction to maintain a desired clearance, and wherein the second temperature is less than the first temperature.

In another embodiment according to the previous embodiment, the carrier is comprised of a plurality of circumferentially spaced carrier portions each having a cavity, and including positioning a control ring in the cavities such that the control ring facilitates mounting the carrier to a case structure.

In another embodiment according to any of the previous embodiments, the first operating condition is defined as an engine accelerating condition and includes supplying the air at the first temperature to directly heat the carrier to move the blade outer air seal radially outwardly in the first direction, and wherein the second operating condition is defined as an engine cruise condition and including supplying air at the second temperature to directly cool the carrier to move the blade outer air seal radially inwardly in the second direction.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 2 is a schematic view of a control ring and a BOAS positioned between a blade and a turbine case.

FIG. 3A is a schematic view of an assembly position showing the carriers of the BOAS resting on the control ring.

FIG. 3B is a schematic view similar to FIG. 3A but showing a steady-state idle position for the carriers and the control ring.

FIG. 3C is a schematic view similar to FIG. 3A but showing an acceleration condition for the carriers and the control ring.

FIG. 3D is a schematic view similar to FIG. 3A but showing a steady-state high power position for the carriers and the control ring.

FIG. 3E is a schematic view similar to FIG. 3A but showing a deceleration condition for the carriers and the control ring.

DETAILED DESCRIPTION

Figure 1:
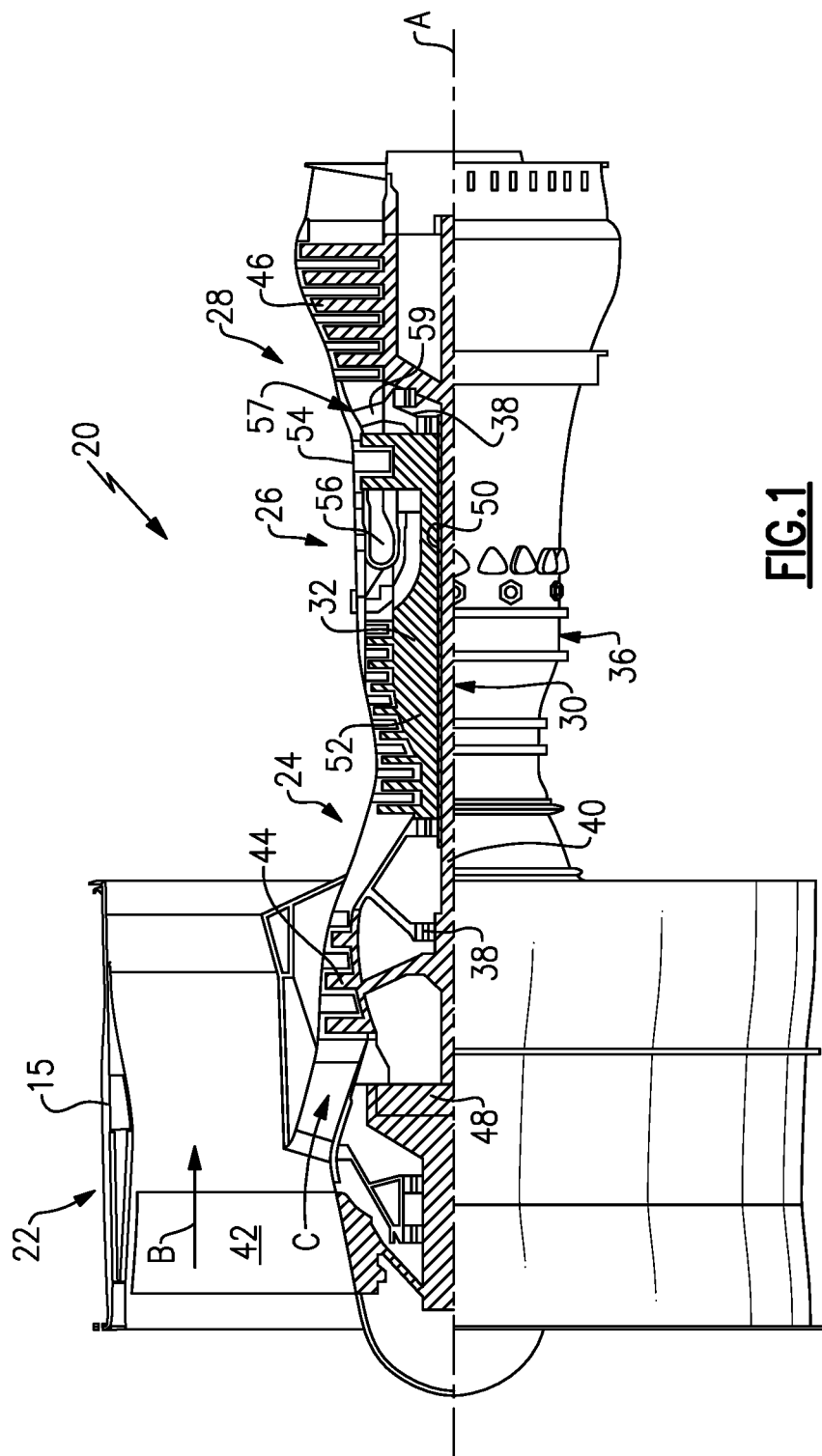
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

FIG. 2 shows a blade outer air seal assembly 60 for maintaining a clearance gap G away from a radially outer tip of a rotating blade 62. In one example, the blade 62 is a component of the turbine section 28 as shown in FIG. 1. However, the blade outer air seal assembly 60 may be used in other engine configurations and/or locations.

The blade outer air seal assembly 60 includes a blade outer air seal 64 that is mounted to a carrier 66. In one example, the carrier 66 is comprised of a plurality of circumferentially spaced carrier portions 68, as will be explained below. The carrier portions 68 have a cavity 70 that receives a control ring 72. The control ring 72 provides a mount structure for the carrier portions 68 and facilitates attachment of the carrier 66 to a case structure 75. In one example, the case structure 75 comprises an outer case of the high pressure turbine 54. The control ring 72 provides structural support to maintain the carrier portions 68 in a desired location, as will be explained below. While FIGS. 3A-3E show a plurality of carrier portions, another example can include a carrier that is a full hoop ring.

In the multi-piece example shown in FIG. 3A, the carrier portions 68 are circumferentially spaced apart from each other by small gaps and each have the cavity 70 that receives the control ring 72. The cavity 70 has a radial height that is greater than a radial thickness of the control ring 72. As the engine experiences different operating conditions, the carrier elements 68 and control ring 72 will expand/contract at different rates which changes the radial gap between an upper portion 66a of the carrier portions 68 and an upper surface 74 of the control ring 72, and changes the radial gap between a lower portion 66b of the carrier portions 68 and a lower surface 76 of the control ring 72.

In the example shown in FIG. 3A, there are gaps between circumferential edges 78 of the carrier portions 68. In this assembly position of FIG. 3A, the engine is under a low load or no load condition. Thus, the carrier portions 68 sit on a radially outer face 74 of the control ring 72 and there is a relatively large gap 80 at the radially inner face 76 of the control ring 72.

In FIG. 3B, the engine heats up and is at a state-state idle condition. The carrier portions 68 respond more quickly to changes in temperature than the control ring 72. The carrier portions 68 remain on the control ring 72; however, the carrier-to-carrier gaps have closed due to the carrier portions 68 growing in circumferential length. As the carrier portions 68 expand circumferentially, the circumferential edges 78 contact and lock together, which effectively forms a single carrier ring. The gap 80 remains between the lower portions 66b of the carrier portions 68 and the control ring 72.

In FIG. 3C, the engine is operating under an acceleration condition where the engine heats up quickly. The carrier portions 68 remain locked together and grow in a radial direction. The carrier portions 68 expand radially outwardly much more quickly than does the control ring 72. This will form a gap 82 between the radially outer face 74 of the control ring 72 and the upper carrier portions 66a. This movement reduces the size of the gap 80 between the radially inner face 76 of the control ring 72 and the lower carrier portions 66b.

In FIG. 3D, the engine is operating at a cruise condition where there is steady-state high power. At steady-state conditions that are higher than an idle condition, the carrier portions 68 remain locked together and the control ring 72 has grown radially to minimize the gap 82 between the upper carrier portions 66a and the control ring 72. This reduces leakage around the blade 62 (FIG. 2) and improves operating efficiency. The gap 80 between the lower carrier portions 66b and the control ring 72 increases in size.

In FIG. 3E, the engine is operating at a deceleration (landing) condition where the carrier portions 68 unlock and drop radially inward onto the upper surface 74 of the control ring 72, which eliminates the gap 82. This occurs because the carrier portions 68 cool more quickly than the control ring 72. The thermally slow responding control ring 72 prevents the carrier portions 68 from moving in radially to reduce the tip clearance.

Figure 4:
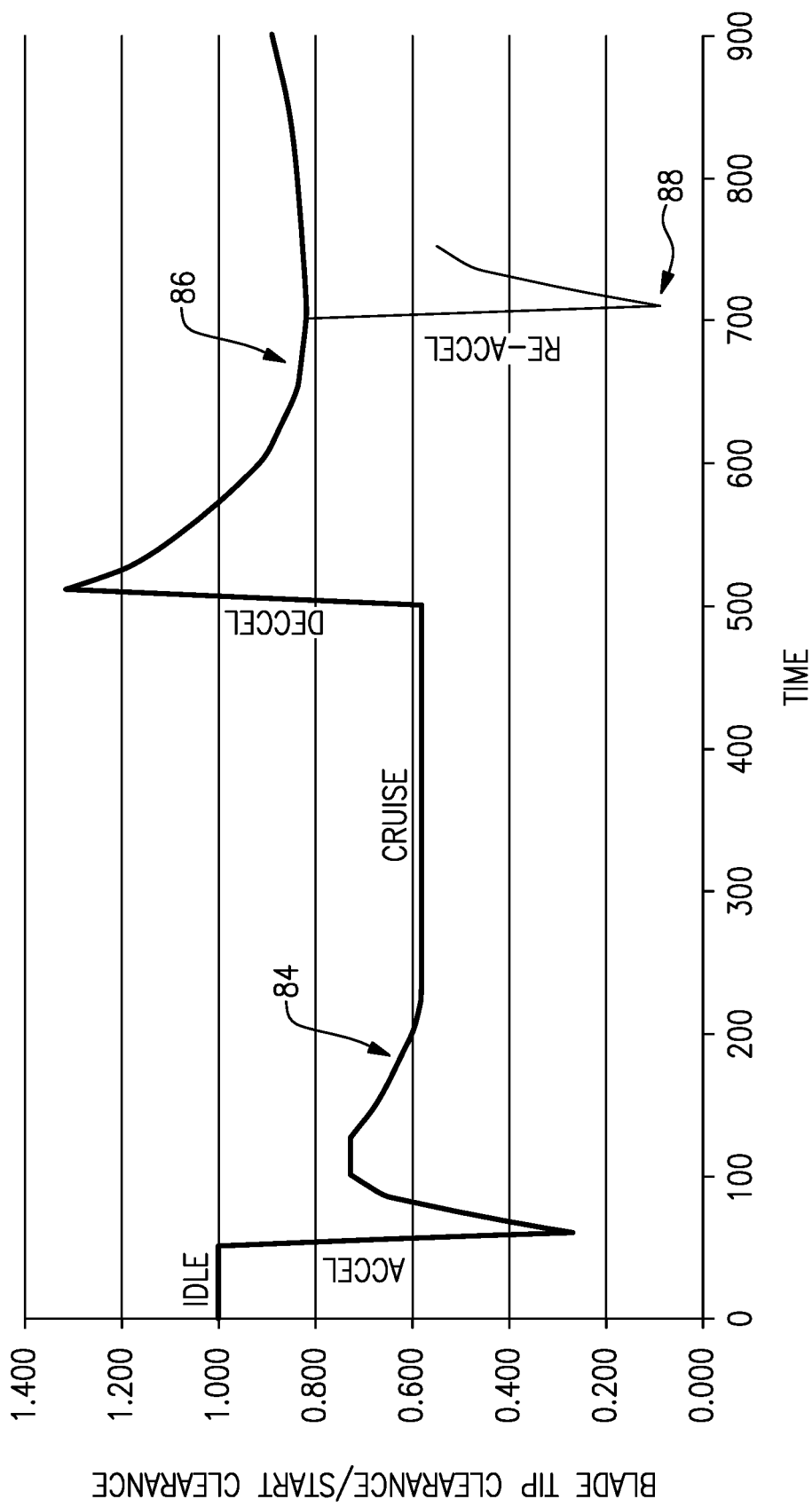
FIG. 4 is a graph showing turbine blade clearances versus time for the operating conditions shown in FIGS. 3A-3E.

FIG. 4 shows an example of a tip clearance curve (between BOAS 60 and blade 62) over various operating conditions of the engine. During an acceleration condition (FIG. 3C), the blade 62 heats up and increases in length radially in a short period of time, which reduces the clearance. The BOAS 60 expands more slowly to the increasing temperature, as indicated at 84 in FIG. 4, and eventually settles within a clearance range during cruise (FIG. 3D). During deceleration conditions (FIG. 3E), the blade 62 shrinks in a radially inward direction which increases the clearance. The BOAS 60 shrinks more slowly to the decreasing temperature, as indicated at 86 in FIG. 4, and eventually settles within a clearance range.

However, should a re-acceleration event be required, the tip clearance can be reduced quite quickly. Such an event would occur if the aircraft was coming in for a landing but then has to re-accelerate to climb upward again. During this type of re-acceleration condition, the blade 62 grows radially outward quickly, which can reduce the tip clearance. As discussed above, the BOAS 60 responds more slowly and eventually expands to increase the tip clearance. However, as indicated at 88 in FIG. 4, the most limiting condition is the re-acceleration event and this would therefore be the limiting condition for the flight envelope to prevent rubbing of the BOAS on the blade.

In one example embodiment, the engine includes an Advanced Passive Clearance Control (APCC) system that is designed to reduce high pressure turbine clearances. This system does this by eliminating the re-acceleration limiting condition that may occur during flight. As discussed above, the re-acceleration condition is the limiting clearance condition that sets all other clearances throughout the flight envelope. By eliminating this condition, the remaining clearances can be designed to be lower throughout the flight envelope.

Figure 5:
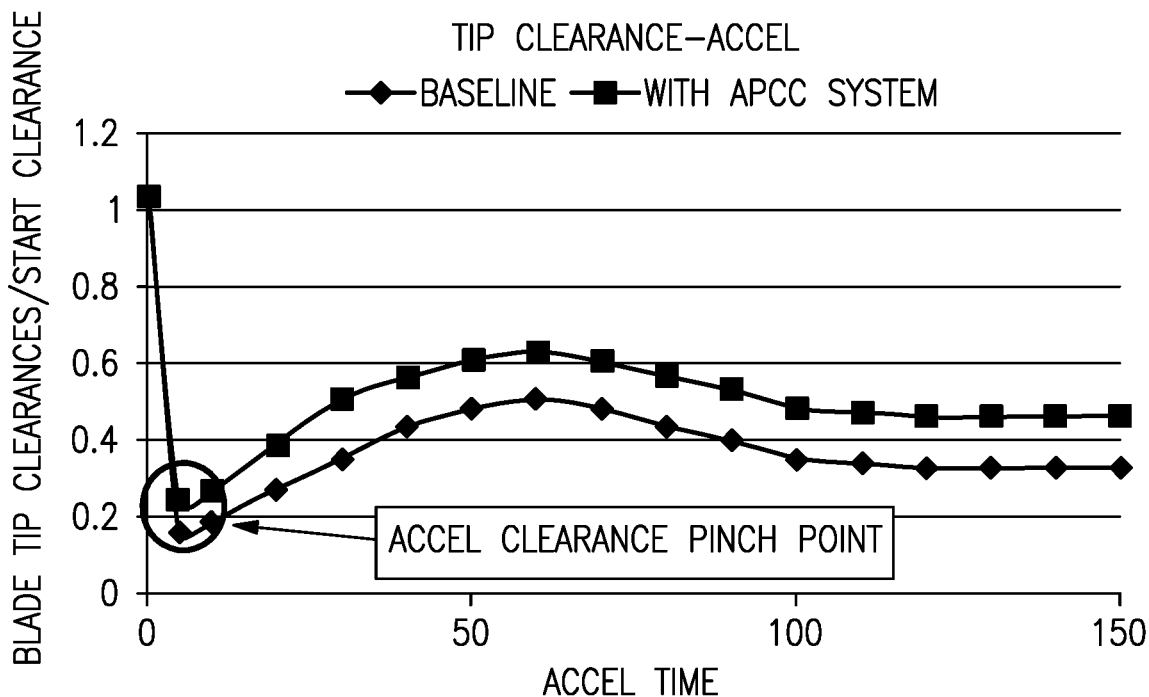
FIG. 5 is a graph showing turbine blade clearances versus time for the acceleration condition and comparing an engine with and without APCC.
Figure 6:
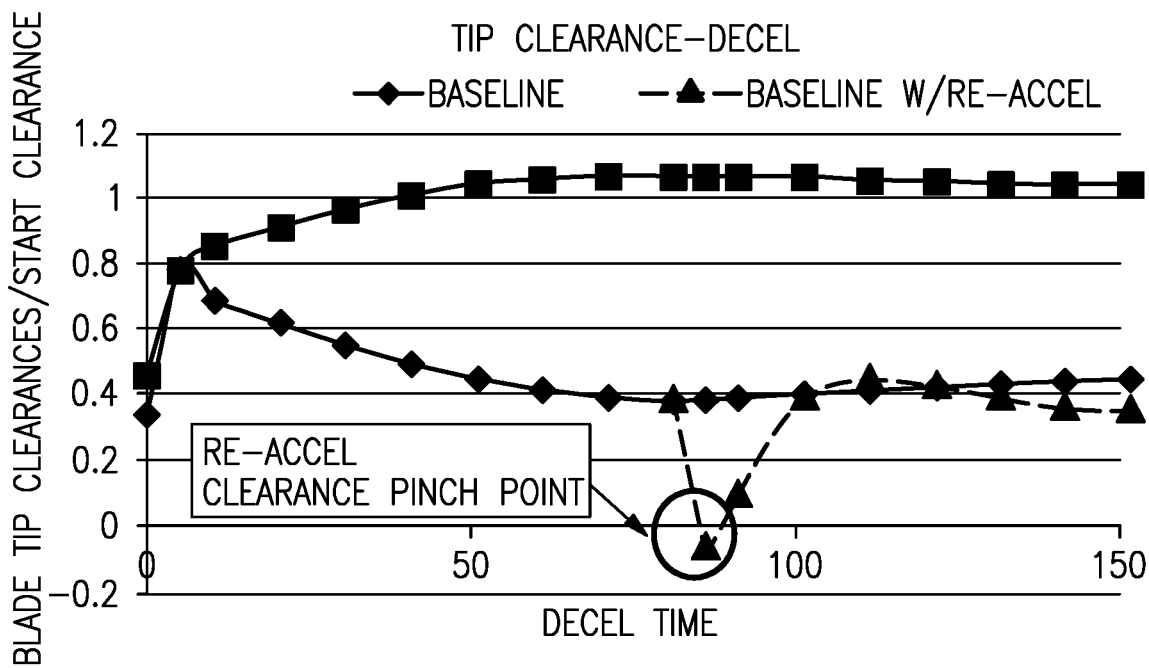
FIG. 6 is a graph showing turbine blade clearances versus time for the deceleration condition and comparing an engine with and without an APCC system.

FIGS. 5-6 show the clearance curves with/without APCC starting at the same clearance. FIG. 5 shows a tip clearance curve during an acceleration event that compares a baseline condition (no APCC system) to a condition where the APCC system is used. FIG. 6 shows a tip clearance curve that compares a baseline condition (no APCC system) that shows a re-acceleration condition to a condition where the APCC system is used. The APCC system is used to eliminate the re-acceleration condition by thermally controlling growth of the blade and/or BOAS during the re-acceleration event. The sharp reduction in clearance in the re-acceleration condition does not occur with the APCC system so the entire baseline curve can be moved down in clearance. The acceleration dip of FIG. 5 is slightly reduced due to the fast response provided by the APCC system.

Figure 7:
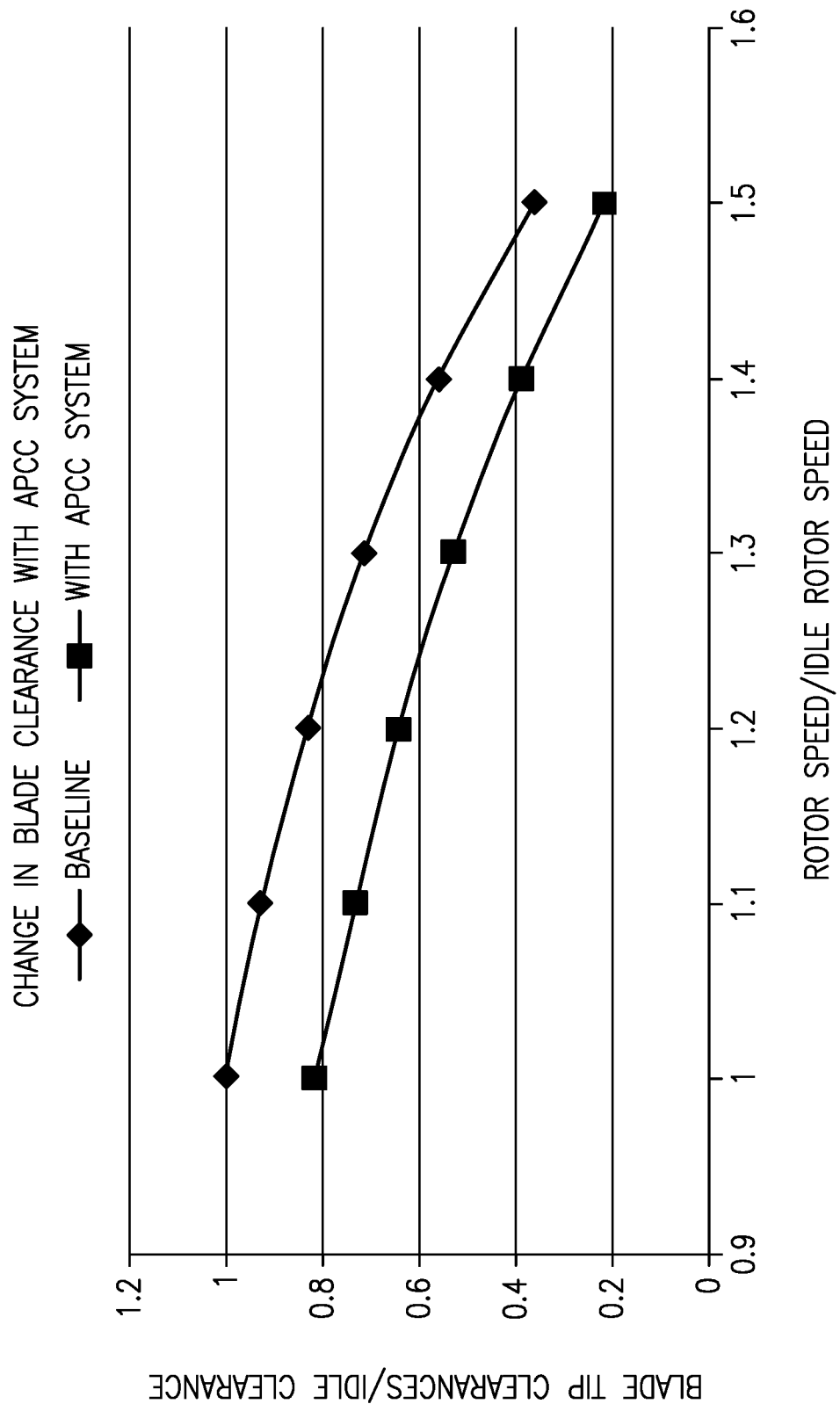
FIG. 7 is a graph showing changes in blade clearance with an APCC system.

The next limiting clearance condition is the acceleration condition (FIG. 5) that occurs during take-off. This limiting condition is what prevents further reductions in the clearances during the cruise condition where the aircraft spends the majority of its time. Therefore, to reduce the clearances even further, the acceleration limiting clearance condition that occurs during take-off needs to be eliminated. Reducing the clearance curve, reduces clearances through the flight envelope. An example of this is shown in FIG. 7, which shows the change in blade clearance in relation to rotor speed. By utilizing the APCC system, the clearances can be minimized.

The APCC system controls clearances through the carrier 66 which separates the BOAS 60 from the growth influence of the case structure 75. Thus, thermal growth that occurs through the carrier 66 is what controls the radial height of the BOAS 60, and thus the clearances between the BOAS 60 and the blade 62. In order to reduce or eliminate the acceleration limiting condition, the BOAS 60 should move radially outwardly as quickly as possible during take-off. This is accomplished by injecting hot air into a cavity of the APCC system to heat-up the carrier 66 to induce radial growth and quickly move the BOAS 60 radially outward. Since the carrier 66 is a much smaller component than the case structure 75, the radial thermal growth occurs fairly quickly.

Figure 8:
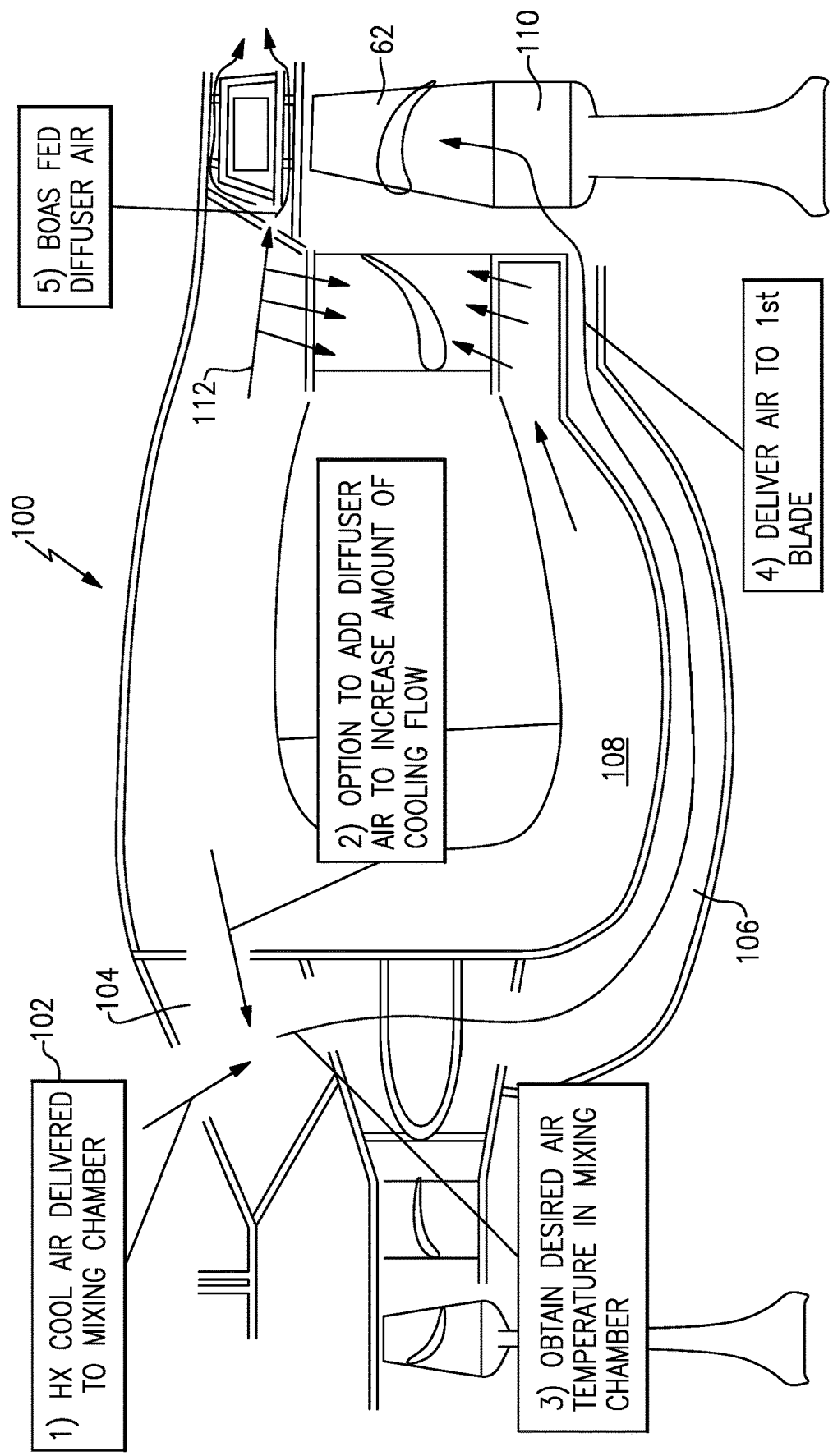
FIG. 8 is a schematic view of using a heat exchanger to cool a turbine blade.

FIG. 8 shows an example of an APCC system 100 that cools a first stage blade assembly for the high pressure turbine. The system 100 includes a heat exchanger 102 that supplies cooling air to a mixing chamber 104. This air is then directed through a channel 106, which is radially inward of a diffuser chamber 108, and then to a base 110 of the blade 62. The mixing chamber 104 may also receive heated air from the diffuser chamber 108 that mixes with the cooling air from the heat exchanger 102 prior to being directed to the base 110 of the blade 62. Diffuser air may also be fed to the BOAS 60 as indicated at 112.

Figure 9:
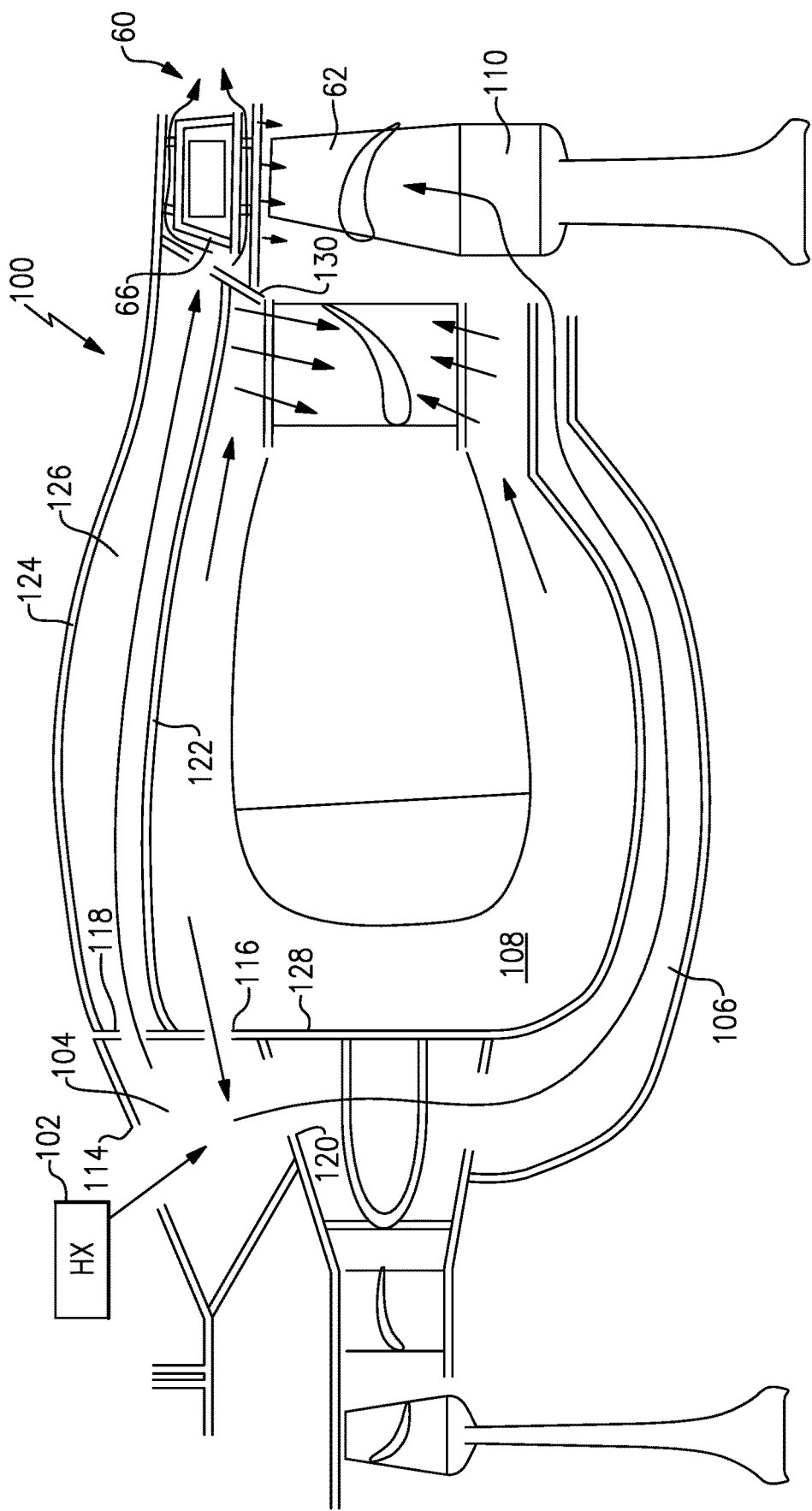
FIG. 9 is a schematic view of using the heat exchanger of FIG. 8 to additionally cool the carrier of the BOAS.

As shown in FIG. 9, the APCC system 100 utilizes the heat exchanger air to deliver both heating and cooling air flow to the BOAS 60. This improves turbine tip clearances and improves BOAS life. The heat exchanger 102 will set the needed temperature for each flight condition. Hot air will be supplied at take-off to reduce/eliminate the acceleration clearance limiting condition and cold air will be delivered at cruise to reduce blade tip clearances. This will significantly improve efficiency and overall operating performance.

The mixing chamber 104 includes a first inlet 114 that receives air flow from the heat exchanger 102 and a second inlet 116 that receives hot diffuser airflow from the diffuser chamber 108. The cooling and heated flows are mixed together to provide flow that is at an optimized temperature for a specified operating condition. The mixing chamber 104 includes a first outlet 118 that directs the air flow to the carrier 66 of the BOAS 60 and a second outlet 120 that directs the air flow to the base 110 of the blade 62. The second outlet 120 directs air through the channel 106, which is radially inward of a diffuser chamber 108.

A circumferential wall 122 is located radially inward of the combustor case 124 to enclose the diffuser chamber 108 on a radially inner location and to provide a channel 126 radially outward of the diffuser chamber 108 to direct flow to the carrier 66. The circumferential wall 122 extends from a fore radial wall 128 that encloses the forward end of the diffuser chamber 108 to and aft radial wall 130 that encloses the aft end of the chamber 108. This eliminates directing hot diffuser air directly to the BOAS 60 as shown in FIG. 8 and provides a more controlled temperature environment where hot and cold air can be supplied to the carrier 66. During acceleration, the BOAS 60 needs to grow radially outwardly as fast as possible so higher temperature air is fed to the carrier 66 from the mixing chamber 104. Once the engine is operating at cruise, cooler air is fed to the carrier 66 to quickly shrink the BOAS 60.

Thus, the subject invention supplies hot air to the BOAS/APCC system at take-off and cold air at cruise. The heat exchanger 102 is used to switch from a hot-cooling air at take-off and cold air cooling supplied at cruise. Certain military and commercial engines use a heat exchanger to cool the air entering the first stage blade. The subject invention uses this same heat exchanger to cool the air entering the BOAS/APCC system. As such, a single heat exchanger is utilized for multiple purposes such as improving blade cooling, providing controlled BOAS cooling, and minimizing turbine clearances.

The heat exchanger provides a clearance benefit by reducing thermal growth in the turbine disk and provides a clearance benefit by controlling growth of the APCC system and BOAS components. The subject invention eliminates the acceleration clearance limiting condition in the APCC system which allows tip clearances to be further tightened. During the cruise flight condition, the BOAS is moved radially inward to maintain a tight clearance with the blade tip by supplying cold air into the mixing cavity of the APCC system to cool the carrier. The addition of this cold air will also have the added benefit of improving the life of the BOAS and possibly reducing the amount of needed cooling flow.

The subject invention provides significantly improved clearance cooling methods. The subject invention is an improvement on Active Clearance Control (ACC) systems used in commercial engines in that the diffuser/turbine case are not being cooled in order to reduce clearances. Instead, a much smaller component in the APCC system is cooled to reduce clearances. It therefore takes less time to react/grow thermally and the clearance response is faster than the ACC system in commercial engines. The subject invention is an improvement on both the active control systems and current passive control systems in that two different air temperatures (hot & cold) are being used to control thermal growth and clearances depending on the flight condition.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A clearance control system for a gas turbine engine comprising:
   a blade outer air seal mounted on a carrier;
   at least one blade rotatable about an engine axis, the blade outer air seal being spaced radially outwardly from a tip of the blade by a clearance;
   a diffuser chamber positioned upstream of the blade;
   a heat exchanger configured to deliver air at a first temperature to the blade outer air seal at a first operating condition to allow the blade outer air seal to move in a first direction to maintain a desired clearance, and configured to deliver air at a second temperature to the blade outer air seal at a second operating condition to allow the blade outer air seal to move in a second direction to maintain a desired clearance, and wherein the second temperature is less than the first temperature; and
   a mixing chamber having a first inlet that receives flow from the heat exchanger, a first outlet to direct flow to the carrier, and a second outlet to direct flow to the blade, and wherein the mixing chamber includes a second inlet that receives diffuser chamber flow to be mixed with flow exiting the heat exchanger.

2. The system according to claim 1 wherein the first operating condition comprises an engine accelerating condition and wherein the air supplied at the first temperature directly heats the carrier to move the blade outer air seal radially outwardly in the first direction.

3. The system according to claim 1 wherein the second operating condition comprises an engine cruise condition and wherein air supplied at the second temperature directly cools the carrier to move the blade outer air seal radially inwardly in the second direction.

4. The system according to claim 1 wherein the carrier is comprised of a plurality of circumferentially spaced carrier portions each having a cavity that receives a control ring, and wherein the control ring provides a mount structure for the circumferentially spaced carrier portions for attachment of the carrier to a case structure.

5. The system according to claim 1 wherein the heat exchanger comprises a single heat exchanger that is used to control a temperature at the blade outer air seal and to control a temperature at the blade.

6. The system according to claim 1 wherein a temperature of the flow exiting the heat exchanger at the first inlet is set based on a desired temperature for each flight operating condition.

7. The system according to claim 1 wherein the heat exchanger is configured to additionally provide cooling flow to the blade at a radially inward location of the blade outer air seal.

8. The system according to claim 7 wherein the blade comprises a first stage of a turbine.

9. The system according to claim 1 including a wall portion that defines a first flow path radially outward of the diffuser chamber and radially inward of a case structure that supports the carrier, and wherein the first outlet from the mixing chamber directs flow into the first flow path.

10. The system according to claim 9 including providing a second flow path radially inward of the diffuser chamber, and wherein the second outlet directs flow from the mixing chamber into the second flow path.

11. The system according to claim 1 wherein the mixing chamber is upstream of the diffusion chamber.

12. The system according to claim 11 including a wall portion that defines a first flow path radially outward of the diffuser chamber and radially inward of a combustor case, and including a second flow path radially inward of the diffuser chamber, and wherein diffuser chamber flow is directed radially outward through the mixing chamber and to the first outlet which directs flow into the first flow path to directly cool the carrier, and wherein the second outlet directs flow into the second flow path to directly cool the blade.

13. A gas turbine engine comprising:
   a compressor section;
   a combustor section downstream of the compressor section, wherein the combustor section includes a diffuser chamber;
   a turbine section downstream of the combustor section, wherein the turbine section includes a plurality of blades rotatable about an engine axis and a blade outer air seal mounted on a carrier, wherein the blade outer air seal is spaced radially outwardly from a tip of the blades by a clearance; and
   a clearance control system with a heat exchanger configured to deliver air at a first temperature to the blade outer air seal at a first operating condition to allow the blade outer air seal to move in a first direction to maintain a desired clearance, and configured to deliver air at a second temperature to the blade outer air seal at a second operating condition to allow the blade outer air seal to move in a second direction to maintain a desired clearance, and wherein the second temperature is less than the first temperature, and wherein the clearance control system includes a mixing chamber having a first inlet that receives flow from the heat exchanger, a first outlet to direct flow to the carrier, and a second outlet to direct flow to the blades, and wherein the mixing chamber includes a second inlet that receives diffuser chamber flow to be mixed with flow exiting the heat exchanger.

14. The engine according to claim 13 wherein the heat exchanger comprises a single heat exchanger that is used to control a temperature at the blade outer air seal and to control a temperature at the blades.

15. The engine according to claim 13 wherein the mixing chamber is upstream of the diffusion chamber.

16. The engine according to claim 15 including a wall portion that defines a first flow path radially outward of the diffuser chamber and radially inward of a combustor case, and including a second flow path radially inward of the diffuser chamber, and wherein diffuser chamber flow is directed radially outward through the mixing chamber and to the first outlet which directs flow into the first flow path to directly cool the carrier, and wherein the second outlet directs flow into the second flow path to directly cool the blade.

17. The engine according to claim 13 wherein the carrier is comprised of a plurality of circumferentially spaced carrier portions each having a cavity that receives a control ring that mounts the carrier to a case structure.

18. The engine according to claim 17 wherein the first operating condition comprises an engine accelerating condition and wherein the air supplied at the first temperature directly heats the carrier to move the blade outer air seal radially outwardly in the first direction, and wherein the second operating condition comprises an engine cruise condition and wherein air supplied at the second temperature directly cools the carrier to move the blade outer air seal radially inwardly in the second direction.

19. The engine according to claim 18 including a wall portion that defines a first flow path radially outward of the diffuser chamber and radially inward of the case structure that supports the carrier, and wherein the first outlet from the mixing chamber directs flow into the first flow path.

20. The engine according to claim 19 including a second flow path radially inward of the diffuser chamber, and wherein the second outlet directs flow into the second flow path to cool the blade.

21. A method of controlling tip clearance in a gas turbine engine comprising:
providing a blade outer air seal mounted on a carrier and at least one blade rotatable about an engine axis, the blade outer air seal being spaced radially outwardly from a tip of the blade by a clearance;
providing a mixing chamber having a first inlet that receives flow from a heat exchanger, a first outlet to direct flow to the carrier, and a second outlet to direct flow to the blade, and wherein the mixing chamber includes a second inlet that receives diffuser chamber flow from a diffuser chamber to be mixed with flow exiting the heat exchanger;
delivering air at a first temperature to the blade outer air seal at a first operating condition to allow the blade outer air seal to move in a first direction to maintain a desired clearance; and
delivering air at a second temperature to the blade outer air seal at a second operating condition to allow the blade outer air seal to move in a second direction to maintain a desired clearance, and wherein the second temperature is less than the first temperature.

22. The method according to claim 21 wherein the mixing chamber is upstream of the diffusion chamber, and including directing diffuser chamber flow radially outward into a channel that is radially outward of the diffuser chamber and which is formed by a circumferential wall located radially inward of a combustor case and radially outward of the diffuser chamber.

23. The method according to claim 21 wherein the carrier is comprised of a plurality of circumferentially spaced carrier portions each having a cavity, and including positioning a control ring in the cavities such that the control ring facilitates mounting the carrier to a case structure.

24. The method according to claim 21 wherein the first operating condition is defined as an engine accelerating condition and including supplying the air at the first temperature to directly heat the carrier to move the blade outer air seal radially outwardly in the first direction, and wherein the second operating condition is defined as an engine cruise condition and including supplying air at the second temperature to directly cool the carrier to move the blade outer air seal radially inwardly in the second direction, and wherein the heat exchanger comprises a single heat exchanger that is used to control a temperature at the blade outer air seal and to control a temperature at the blade.

25. The method according to claim 21 including providing a wall portion that defines a first flow path radially outward of the diffuser chamber and radially inward of a case structure that supports the carrier, providing a second flow path radially inward of the diffuser chamber, and wherein the first outlet from the mixing chamber directs flow into the first flow path to directly cool the carrier, and wherein the second outlet directs flow into the second flow path to directly cool the blade.

* * * * *